US008959490B2

(12) United States Patent
Gupta et al.

(10) Patent No.: US 8,959,490 B2
(45) Date of Patent: *Feb. 17, 2015

(54) OPTIMIZING HEAP MEMORY USAGE

(75) Inventors: Satish Chandra Gupta, Kerala (IN); Kumar Rangarajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 13/462,766

(22) Filed: May 2, 2012

(65) Prior Publication Data

US 2012/0278585 A1 Nov. 1, 2012

Related U.S. Application Data

(62) Division of application No. 11/867,339, filed on Oct. 4, 2007, now Pat. No. 8,185,880.

(51) Int. Cl.
| | | |
|---|---|---|
| *G06F 9/44* | (2006.01) | |
| *G06F 11/00* | (2006.01) | |
| *G06F 9/45* | (2006.01) | |
| *G06F 11/34* | (2006.01) | |
| *G06F 11/36* | (2006.01) | |

(52) U.S. Cl.
CPC ............ *G06F 8/443* (2013.01); *G06F 11/3466* (2013.01); *G06F 11/3612* (2013.01); *G06F 2201/865* (2013.01)
USPC ........... 717/130; 717/127; 717/131; 714/38.1

(58) Field of Classification Search
None
See application file for complete search history.

(56) References Cited

U.S. PATENT DOCUMENTS

| 5,193,180 | A | * | 3/1993 | Hastings .................. 717/163 |
| 5,335,334 | A | * | 8/1994 | Takahashi et al. ............ 711/164 |
| 5,335,344 | A | * | 8/1994 | Hastings .................... 714/35 |
| 5,535,329 | A | * | 7/1996 | Hastings .................... 714/35 |
| 5,581,696 | A | * | 12/1996 | Kolawa et al. .............. 714/38.1 |
| 5,613,063 | A | * | 3/1997 | Eustace et al. .............. 714/38.1 |
| 5,835,701 | A | * | 11/1998 | Hastings .................... 714/35 |
| 5,842,019 | A | * | 11/1998 | Kolawa et al. ............... 717/130 |
| 5,870,607 | A | * | 2/1999 | Netzer ..................... 717/127 |
| 5,950,003 | A | * | 9/1999 | Kaneshiro et al. ........... 717/130 |

(Continued)

OTHER PUBLICATIONS

Shaham, R., et a., "Heap-Liveness-Based Memory Management: Potential, Tools, and Algorithms", Tel-Aviv University [online], 2003 [retrieved Dec. 5, 2013], Retrieved from Internet: <http://www.cs.tau.ac.il/~tvla/sa/theses/phd-ran.pdf>, whole document (cover-p. 106).*

(Continued)

*Primary Examiner* — Don Wong
*Assistant Examiner* — Todd Aguilera
(74) *Attorney, Agent, or Firm* — Steven M. Greenberg, Esq.; CRGO Law

(57) ABSTRACT

Embodiments of the present invention provide a computing system and method to profile a program for finding potential optimization in heap usage by reducing lag and drag in lifetimes of heap memory blocks. The process consists of three steps. First, an instrumentation engine analyzes a given program and inserts additional code at interesting locations to collect needed information. Second, when the instrumented program is executed on a set of test cases, runtime data is collected. Third, since this data is large for a complex and long running program, data is processed to present it to a user in useful ways so that a programmer improves the heap utilization in the program.

15 Claims, 11 Drawing Sheets

(56) References Cited

U.S. PATENT DOCUMENTS

| | | | | |
|---|---|---|---|---|
| 5,953,530 | A * | 9/1999 | Rishi et al. | 717/127 |
| 6,112,297 | A * | 8/2000 | Ray et al. | 712/225 |
| 6,560,773 | B1 | 5/2003 | Alexander et al. | |
| 6,658,653 | B1 * | 12/2003 | Bates et al. | 717/131 |
| 6,718,485 | B1 * | 4/2004 | Reiser | 714/38.1 |
| 7,013,456 | B1 * | 3/2006 | Van Dyke et al. | 717/130 |
| 7,100,003 | B2 | 8/2006 | Betancourt et al. | |
| 7,200,731 | B2 * | 4/2007 | Raut | 711/170 |
| 7,373,637 | B2 * | 5/2008 | DeWitt et al. | 717/131 |
| 7,415,491 | B2 * | 8/2008 | Sekiguchi | 1/1 |
| 7,434,020 | B2 * | 10/2008 | Swafford et al. | 711/170 |
| 7,669,189 | B1 * | 2/2010 | Umamageswaran | 717/127 |
| 7,861,231 | B2 * | 12/2010 | Rangarajan et al. | 717/130 |
| 8,060,543 | B1 * | 11/2011 | Ciot | 707/820 |
| 8,245,209 | B2 * | 8/2012 | Gupta | 717/153 |
| 2004/0133759 | A1 * | 7/2004 | Sekiguchi | 711/170 |
| 2005/0071822 | A1 * | 3/2005 | DeWitt et al. | 717/131 |
| 2005/0144412 | A1 * | 6/2005 | Swafford et al. | 711/170 |
| 2006/0085156 | A1 | 4/2006 | Kolawa et al. | |
| 2006/0123216 | A1 | 6/2006 | Krauss et al. | |
| 2006/0265438 | A1 | 11/2006 | Shankar et al. | |

OTHER PUBLICATIONS

Pan, Michael, "HUP: A Heap Usage Profiling Tool for Java Programs", Tel-Aviv University [online], 2001 [retrieved Jul. 8, 2011], Retrieved from Internet: <http://hup.sourceforge.net/thesis.pdf>, pp. 1-60.*

Rojemo, Noklas, et al., "Lag, drag, void and use—heap profiling and space-efficient compilation revisited", Proc. Intl. Conf. Functional Programming [online], 1996 [retrieved Dec. 5, 2013], Retrieved from Internet: <http://citeseer.ist.psu.edu/viewdoc/summary?doi=10.1.1.30.1219>, pp. 1-8.*

Runciman, C., et al., "Two-Pass Heap Profiling: A Matter of Life and Death", Lecture Notes in Computer Science [online], 1997 [retrieved Dec. 5, 2013], Retrieved from Internet: <http://link.springer.com/chapter/10.1007/3-540-63237-9_27>, pp. 222-232.*

Shaham, R., et al., "On the Effectiveness of GC in Java", ACM SIGPLAN Notices, 2000 [retrieved Dec. 6, 2013], Retrieved from Internet: <https://www.cs.purdue.edu/homes/hosking/ismm2000/papers/shaham.pdff>, pp. 1-6.*

Shaham, R., et al. "Heap Profiling for Space-Efficient Java", ACM SIGPLAN Notices [online], 2001, [retrieved Dec. 6, 2013], Retrived from Internet: <http://www.cs.tau.ac.il/~msagiv/pldi01.pdf>, pp. 1-10.*

Wu, Q., et al., "Exposing Memory Access Regularities Using Object-Relative Memory Profiling", International Symposium on Code Generation and Optimization [online], 2004 [retrieved Jun. 8, 2014], Retrieved from Internet: <URL: http://ieeexplore.ieee.org/xpls/abs_all.jsp?arnumber=1281684&tag=1>, pp. 1-9.*

Hastings, R., et al., "Purify: Fast Detection of Memory Leaks and Access Errors," Proceedings of the 1992 Winter USENIX Conference, 1992 [retrieved Sep. 29, 2014], Retrieved from Internet: <URL: http://citeseerx.ist.psu.edu/viewdoc/summary?doi=10.1.1.184.8081>, pp. 125-136.*

Maebe, et al., "Precise detection of memory leaks," WlOS Workshop—26th International Conference on Software Engineering, 2004, pp. 25-31.

* cited by examiner

OPTIMIZING HEAP MEMORY USAGE

CROSS-REFERENCE TO RELATED APPLICATIONS

This application is a Divisional of U.S. application Ser. No. 11/867,339, filed Oct. 4, 2007, now U.S. Pat. No. 8,185,880 entitled "OPTIMIZING HEAP MEMORY USAGE," the entirety of which is incorporated herein by reference.

FIELD OF INVENTION

This invention relates generally a method for profiling software for efficiently computing durations of various phases of all heap memory blocks created during life of a program to find potential optimization in heap memory usage by reducing lag and drag in lifetimes of the heap memory.

BACKGROUND OF THE INVENTION

As software applications become increasingly complex, they require a large number of computing resources. For example, modern applications such as Java Virtual Machines (JVMs) running memory intensive mission critical J2EE applications, network management servers, database servers, web servers etc., require additional amounts of heap memory as the size and complexity of the underlying task increases. However, just like any other resource of a computing system, heap memory is finite for a given computer chip and Operating System combination. Therefore, it is imperative that heap memory should be utilized efficiently especially in a heap intensive application.

Typically life of a heap memory block has four important events: memory allocation, first use, last use and memory de-allocation. As described by N. Rojemo and C. Runciman, "Lag, drag, void and use—heap profiling and space-efficient compilation revisited," Proceedings of ACM SIGPLAN International Conference on Function Programming, pp. 34-41, 1996, and illustrated in FIG. 1 the duration between allocation and first use is called lag, the duration between first use and last use is called use, and the duration between last use and de-allocation is called drag. If the memory is not used at all, the duration between allocation and de-allocation is called void.

The allocation event as illustrated in FIG. 1 is marked by a heap memory allocation call such as malloc( ) method or new operator. The first use and last use events occur when any part of a heap block is used for first and last time respectively. For programming languages with explicit heap memory management such as C/C++, de-allocation event is marked by calling free( ) method or delete operator. For programming languages with implicit memory management, the de-allocation event is marked when the last pointer/reference to that heap memory block is lost thereby making the memory block eligible for garbage collection. It should be noted that conventionally during the drag phase, a memory block is reachable but is not going to be used anymore. Such memory blocks are also known as reachable memory leaks. Evidently, the real utilization of a heap block is only during the use phase. A program that has a lot of heap blocks in lag, drag or void phases, is not utilizing heap efficiently. Software (hereinafter also referred to as program) that has a relatively large amount of heap blocks in lag, drag or void phases, is not efficiently utilizing heap.

IBM® Rational® Purify® described in the following arts R. Hastings and B. Joyce, "Purify: Fast Detection of Memory Leaks and Access Errors," Proceedings of the Winter Usenix Conference, pp. 125-136, 1992; in U.S. Pat. Nos. 5,193,180, 5,335,334 and 5,535,329 describe detecting memory leaks by instrumenting object code. Using an algorithm similar to mark and sweep garbage collection, it finds all heap memory blocks to which there is no direct or indirect pointer, which is an indication that the heap block has been leaked. A disadvantage with the above cited prior art being that lag and drag cannot be found in the reachable heap memory blocks. Other tools such as Parasoft® Insure++® described in U.S. Pat. Nos. 5,581,696 and 5,842,019 have the same kind of deficiencies of not being sufficiently capable of analyzing lag and drag.

Additionally, several other attempts have been made to optimize heap usage, but have limitations due to scalability problems and/or failure in reducing lag and drag periods in the life of a heap memory block. Moreover, all these methods are designed for object oriented and garbage collected programming languages, where the granularity is either object or fields. Such approaches are not applicable to programming languages like C and C++ where heap memory can be accesses in arbitrarily and randomly by using pointer arithmetic. In C/C++ programming language, the atomic unit is a byte rather than a field or object. Thus, updating timestamp at every byte access has a relatively large runtime cost rendering these techniques unscalable and useless.

Without a way for providing a method and system for automatically providing durations of lag, drag and void phases of all heap memory blocks in a useful manner wherein a user can exploit this information to design program modifications that will reduce or eliminate lag, drag and void phases leading to more efficient heap utilization and reduced maximum and average heap requirements for the program, the promise of this technology may never be fully achieved. The technique described in this invention is more generic and is applicable to programming languages such as C/C++, Java etc., by virtue of the fact that it is applicable to the least-constrained heap memory model of C language, and hence becomes more efficient as a heap memory model become more constrained as in Java. Yet, it is efficient and scalable to be used for optimizing large enterprise scale applications running for long duration of time. Moreover, the technique doesn't require access to or modification in the source code and can be used with the system having third party binary libraries.

SUMMARY OF THE INVENTION

Disclosed is a system and a method for optimizing usage of heap memory while executing a program, comprising inserting additional instruction at predefined locations into a program, the additional instruction configured to search a header of a heap memory block to identify a lag and a drag. Creating a header for each heap memory block allocated, wherein the header is configured to record a size and allocation time for each of the heap memory blocks. Collecting runtime data, the runtime data stored in the header of the heap memory block comprising timestamps associated with the lag and drag of the heap memory, wherein collecting runtime data comprises recording a de-allocation time in the header and dumping the header into a file when the memory block is freed. Identifying the lag and drag lifetimes associated with the heap memory block, thereby improving performance of the heap memory during execution of a program. To identify the lag and drag lifetimes a bit map table is created comprising two bits for all allocated heap memory, wherein the first bit indicates first use of the heap memory and the second bit indicates last use of the heap memory, the bit map table can be searched and indicates the usage of the memory block.

For every use of the heap memory, if the first bit in the bit map table is not set, the searching for the header of the corresponding heap memory block and recording the current timestamp as the first use timestamp, and updating the first use bit for all addresses associated with that heap memory block in the bit map table for that memory as 1. Subsequently setting the last use bit in the table for that memory to 1. A census is performed on the heap memory after a user defined duration which consists of sequentially sweeping through the heap memory wherein if header is found for the heap memory block, reading the size of the heap memory block in the header, and checking the bit map table for all addresses associated with the heap memory block. If any last use bit has a value 1 for a memory in that heap memory block, then recording a current timestamp as last used timestamp in the header; and setting last use bit for all memory in that heap memory block to a value zero.

BRIEF DESCRIPTION OF THE DRAWINGS

These and further aspects of the present invention will become apparent from and will be elucidated with respect to the embodiments described hereinafter with reference to the accompanying drawings. The drawings illustrate the embodiments of the invention, and together with the description, serve to further explain the principles of the invention. In the drawings

DETAILED DESCRIPTION

Figure 1:
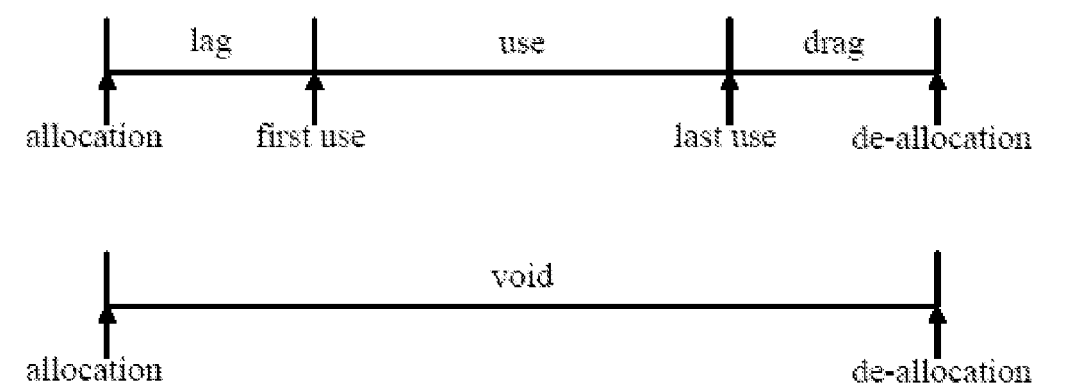
FIG. 1 illustrates various phases in the life of a heap memory block: lag, use, drag and void.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. Where reference is made in any one or more of the accompanying drawings to steps and/or features, which have the same reference numerals, those steps and/or features have for the purposes of this description the same function(s) or operation(s), unless the contrary intention appears.

This disclosure provides a novel method to profile a program for finding potential optimization in heap usage by reducing lag and drag in lifetimes of heap memory blocks. The process consists of three steps. First, an instrumentation engine analyzes a given program, and inserts additional code at interesting locations to collect needed information. Second, when the instrumented program is executed on a set of test cases, runtime data is collected. Third, since this data could be relatively large for a complex and long running program, data is processed to present it to a user (also referred to as a programmer) in useful ways so that the programmer can improve the heap utilization in the program.

Figure 2:
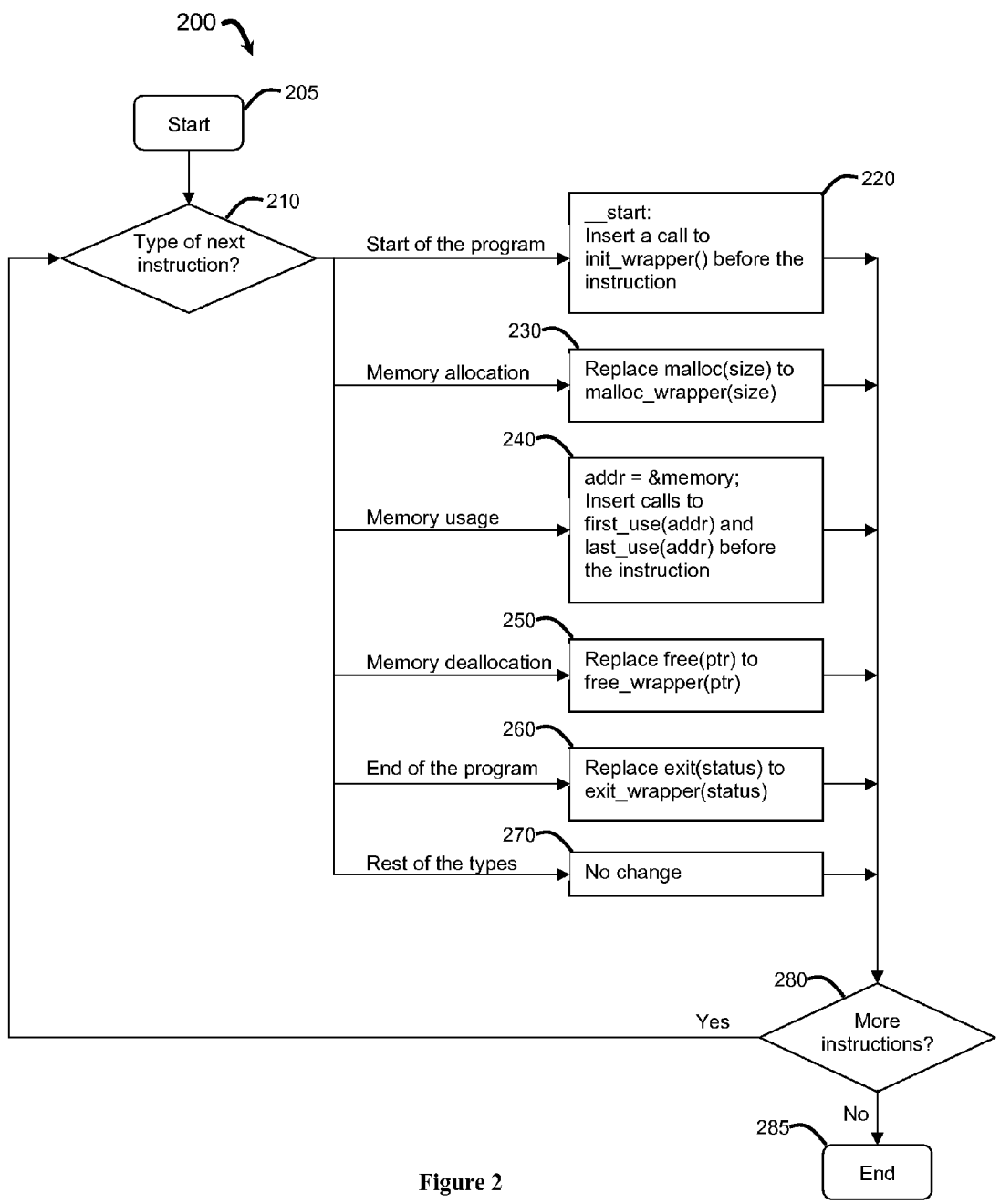
FIG. 2 illustrates code instrumentation 200 at interesting (predefined) locations in the program.

As illustrated in FIG. 2, there are five types of locations that need to be instrumented: start of a program, memory allocation sites, memory usage sites, memory de-allocation sites, and end of the program. The instrumentations begins are step 205 and in step 210 the type of instrumentations is determined. At the start of the program in step 220 typically in accordance with the invention additional (also referred to as extra) code is inserted for initializing a page table that maintains a bit mapping (also referred to as bit map table) for the heap memory, where 2 bits, which are initialized to zeros, are stored for each byte in the heap. The page table is similar to that as disclosed in IBM® Rational® Purify® but the meaning, purpose and usages of these bits differ. The first bit represents the first use, and the second bit represents whether the byte has been used since the last (last use) heap census. Start of a program can be identified either by the mainO function in source code, or the _start location in an executable. A call to init_wrapper ( ) is inserted at this location as will be discussed in FIG. 3.

In step 230, the memory allocation occurs. For every memory allocation, additional space (called header) is allocated to store information related to the events in the life cycle of the memory block, namely, allocation, first use, last use, and de-allocation. Current timestamp (or total heap memory allocated so far) is stored as an allocation event, and the rest of the events are initialized with zero. Memory allocation can be identified by a call to malloc( ), which is intercepted and replaced by a call to malloc_wrapper( ). The size argument that is passed to malloc ( ) is passed to malloc wrapper ( ).

In step 240, memory usage is described. When a memory is read or written, two tasks are performed for tracking first use and last use events. If the first use bit in the bit mapping for the memory address is zero, then the header for the memory block is located and the current timestamp (or total heap memory allocated thus far) is stored as the first use event, and the first use bits in the bit mappings in the page table for all bytes in the same memory block are set to one, therefore this operation happens only once for each heap memory block. Whenever a variable is used in source code or load/store instruction is used in the object code, a call to first_use(addr) and last_use(addr) is inserted before the statement/instruction, where addr is the address of the memory that is about to be used.

For tracking the last use, unlike the methods listed in prior art which perform expensive operation of locating the header and updating the timestamp in it upon every use of a heap memory, the disclosed invention performs a much inexpensive operation of setting the last use bit in the bit mapping for the memory address to one, and deploys an economical and scalable approximation whose accuracy can be configured and controlled by the user. The method performs a heap census periodically, and a user can define the period as time duration or as quantum of memory allocations. During a heap census, every heap memory block in the heap memory is examined. If any byte in the heap memory block has the last use bit set in the corresponding bit mapping in the page table, it means that the block has been used since the last census. Therefore the last census works as a conservative approximation for the last use timestamp. The header of the heap memory block is updated to store the current census identity as the last use of the heap memory block, and in the page table, last use the bit is cleared for all bytes in that memory block.

In step 250 memory de-allocation occurs. When a heap memory block is freed, the current timestamp (or total heap memory allocated so far) is stored as de-allocation event in the header, and the header is dumped in a file for further processing. Memory de-allocation can be identified by a call to free( ), which is intercepted and replaced by a call to free_wrapper( ). The pointer argument that is passed to free( ) is passed to free_wrapper( ). The header of the heap memory block is updated to store the de-allocation time, and dump the complete header information into a file for further processing. In step 260 end of the program is encountered, wherein the call to exit( ) function is intercepted and replaced by exit_wrapper( ), and the status argument that is passed to exit( ) is passed to exit_wrapper( ). The complete heap is scanned, and for each live heap block, the tasks defined above under the Memory De-allocation are performed. At step 270, if the instruction is not of any type described for step 220, 230, 240, 260, it determined to be uninteresting and is left unchanged without inserting any additional code. After processing, in step 280 it is determined if there are further instructions for processing, if YES, control is transferred to step 210, if NO, then control is transferred to step 285, which terminates the method 200.

When the instrumented program terminates, the following data is available for every heap block allocated during the life of program: allocation time, first use time, last alive census identification (census id), de-allocation time, and corresponding call chains. And for every census, the census time and the call chain at that time are available. This results in a relatively large amount of data for a long running complex program. The method 200 further discloses to consolidate the data and a ranking system to identify allocation sites that have the highest potential for heap usage reduction.

Advantages of the method include high scalability because of its unique approximations to reduce the runtime overheads; moreover a user can control the degree of approximation, efficiency and accuracy of the data collection. A further advantage is that the method can be applied either as source code instrumentation (SCI) or object code instrumentation (OCI), or even a heterogeneous approach of applying SCI on some modules and OCI on the remaining modules. Typically, applications are built by linking with third party object libraries, for which source code is not available. Even in such situations, this method is effective because it can operate on object code without requiring the source code. A further advantage is that the ranking system is highly effective in quickly identifying the heap memory allocation sites with high potential for usage reduction. Though C/C++ is used here to describe the problem and solution, the method, however, is independent of any specific language features, therefore it is applicable to any programming language. The method can be adapted to the language with garbage collection (e.g. Java) by using the garbage collection time as de-allocation time.

Figure 3:
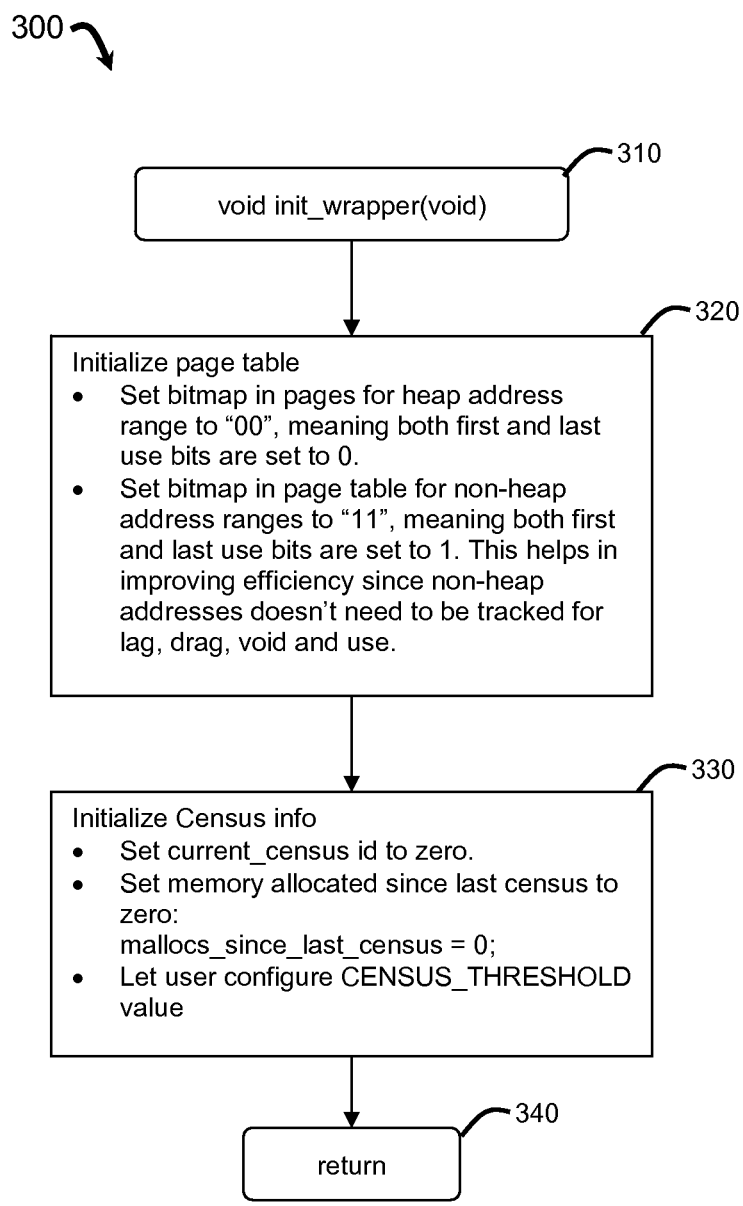
FIG. 3 illustrates initialization of the page table and census information at the start of the program.

The page table has a bit map (also referred to as a bit map table), and stores 2 bits for every byte of used heap memory. The first bit represent whether the corresponding byte has been used at least once, and the second bit represents whether the byte has been used since the last census, as illustrated in the algorithm below:

typedef struct_ByteStatus {
int first_use:1;
int last_use:1;

At the start of the program as illustrated in FIG. 3, the method 300 comprises initialization of the page table and census information. It is achieved by inserting a call to init_wrapper( ) function at the start of program execution in step 310. In step 320 the page table is initialized by first setting the bitmap in pages for heap address range to "00", meaning both first and last use bits are set to 0, and setting bitmap in page table for non-heap address ranges to "11", meaning both first and last use bits are set to 1. The advantage here is in improving efficiency since non-heap addresses doesn't need to be tracked for lag, drag, void and use. In step 330 the census information is initialized by setting the current_census id to zero, setting the memory allocated since last census to zero, mallocs_since_last_census=0, and allowing the user configured CENSUS_THRESHOLD value. Once the initialization is completed, the method return in step 340 to the next operation.

typedef struct_PageTable {

Figure 5:
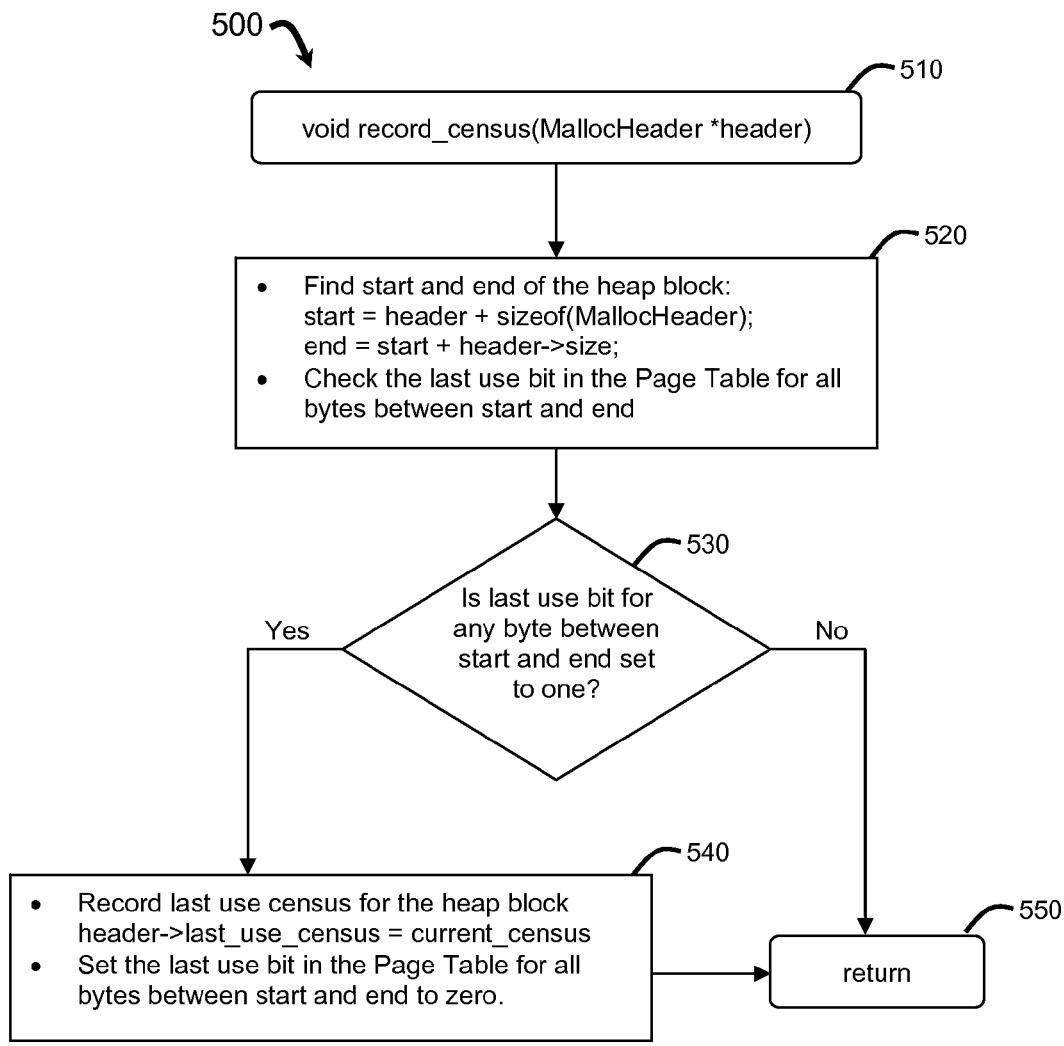
FIG. 5 illustrates actions performed 500 for each malloc block in the heap while performing a census

FIG. 5 illustrates actions performed 500 for each malloc block in the heap while performing a census. The record_census function in step 510 defines the action taken while performing the census. In step 520 for every byte in the malloc block, the last use bit in the page table is checked. In step 530 if the last use bit for any byte is found to be one, it indicates that the memory block has been used since the last census. Then in step 540 the current census id is recorded in the malloc header, and all last use bits in the page table for the malloc block are set to zero. Control returns in step 550.

Figure 6:
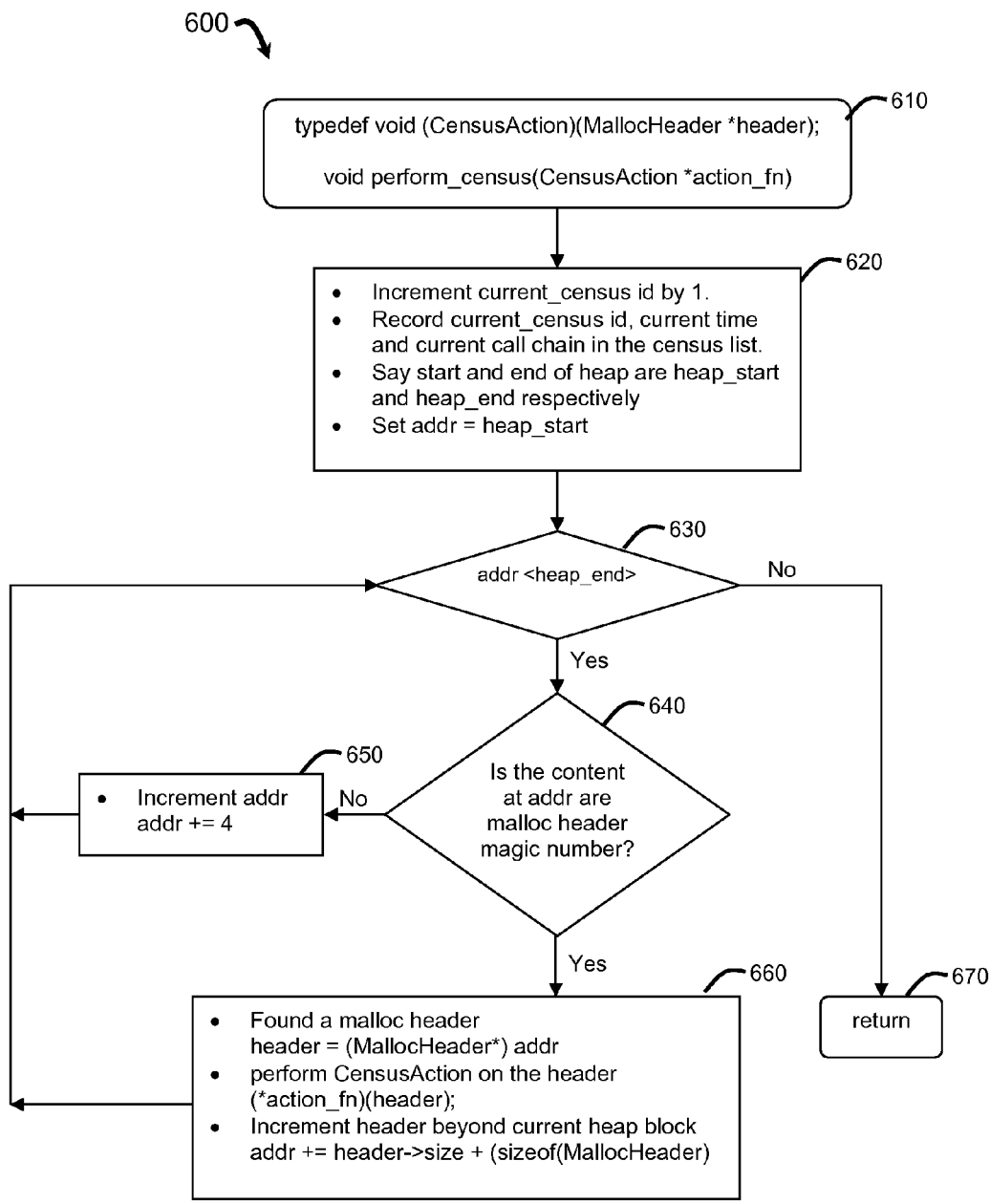
FIG. 6 illustrates the function for performing heap census 600.

FIG. 6 illustrates the function for performing heap census 600. The census is essentially a single pass sweep of the heap. The step 610 takes an action function to be executed for each malloc block found in the heap. In step 620 the current census id is incremented by 1 and census id, current time stamp and call chain is recorded. In step 630, 640 and 650, each memory from start to end of the heap is checked to see whether the memory contains magic number indicating start of a memory block. In step 660, while sweeping the heap, if the magic number is found, it indicates the start of the malloc header followed by the malloc block. The action function is executed by passing it the malloc header. In step 670, when it reached end of the heap memory, the census operation completes.

Figure 7:
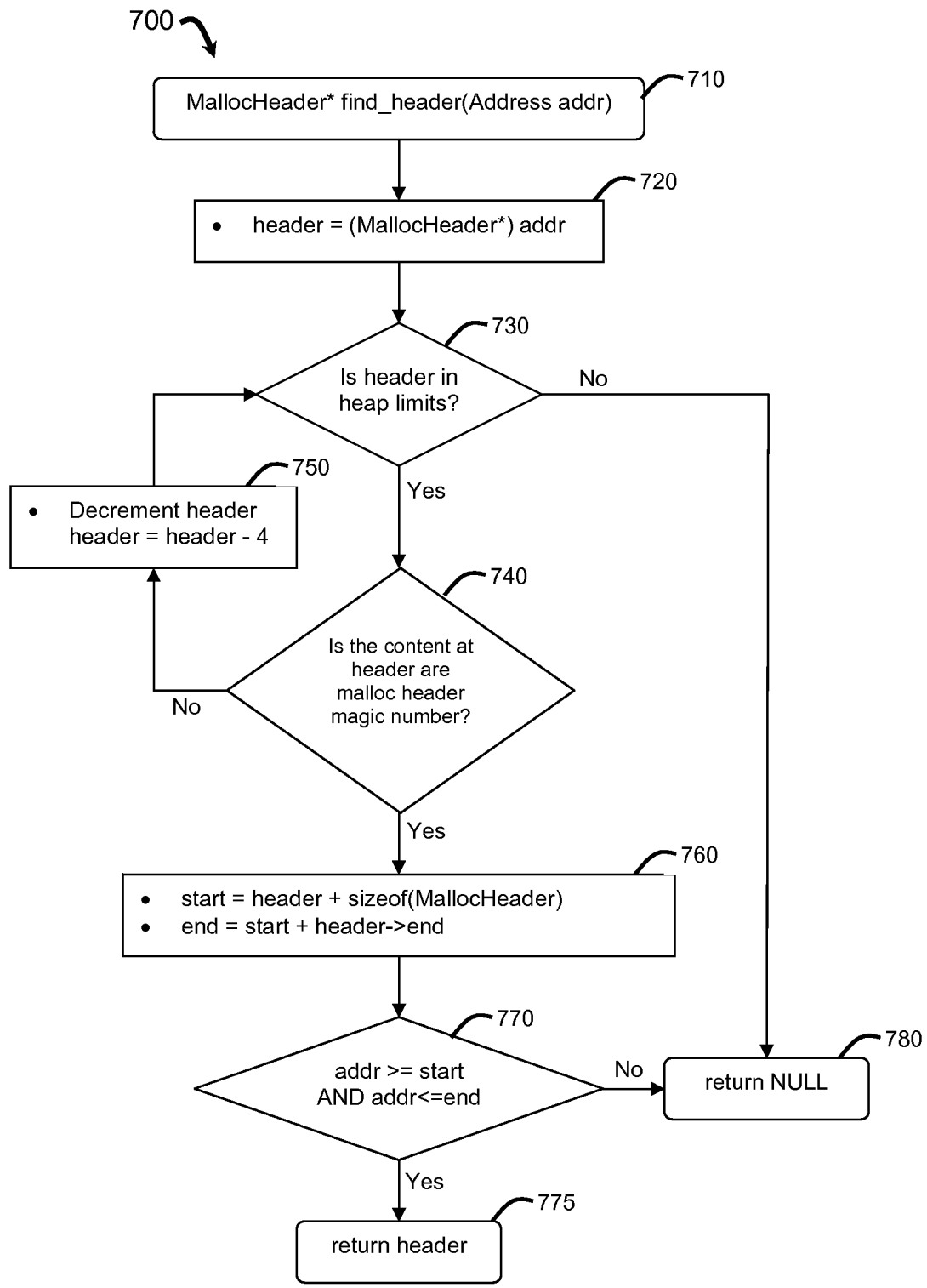
FIG. 7 illustrates the find_header function 700 for finding the header of the malloc block that contains the given address.

FIG. 7 illustrates the find_header function 700 for finding the header of the malloc block that contains the given address. The find_header is a utility used while performing the instrumentation for memory usage. In step 710, it takes the memory address for which header needs to be found. In step 720, it casts the address to malloc header. In step 730, 740, 750, for a given address, it checks whether the address is within heap limits and traverses the heap in backward direction looking for the magic number. When found, in step 760, it uses the heap block size stored in the header to verify in decision block 770 that the given address lays within the block. If true, in step 775, it returns the start of the malloc header, else it returns NULL in step 780 indicating failure.

Figure 8:
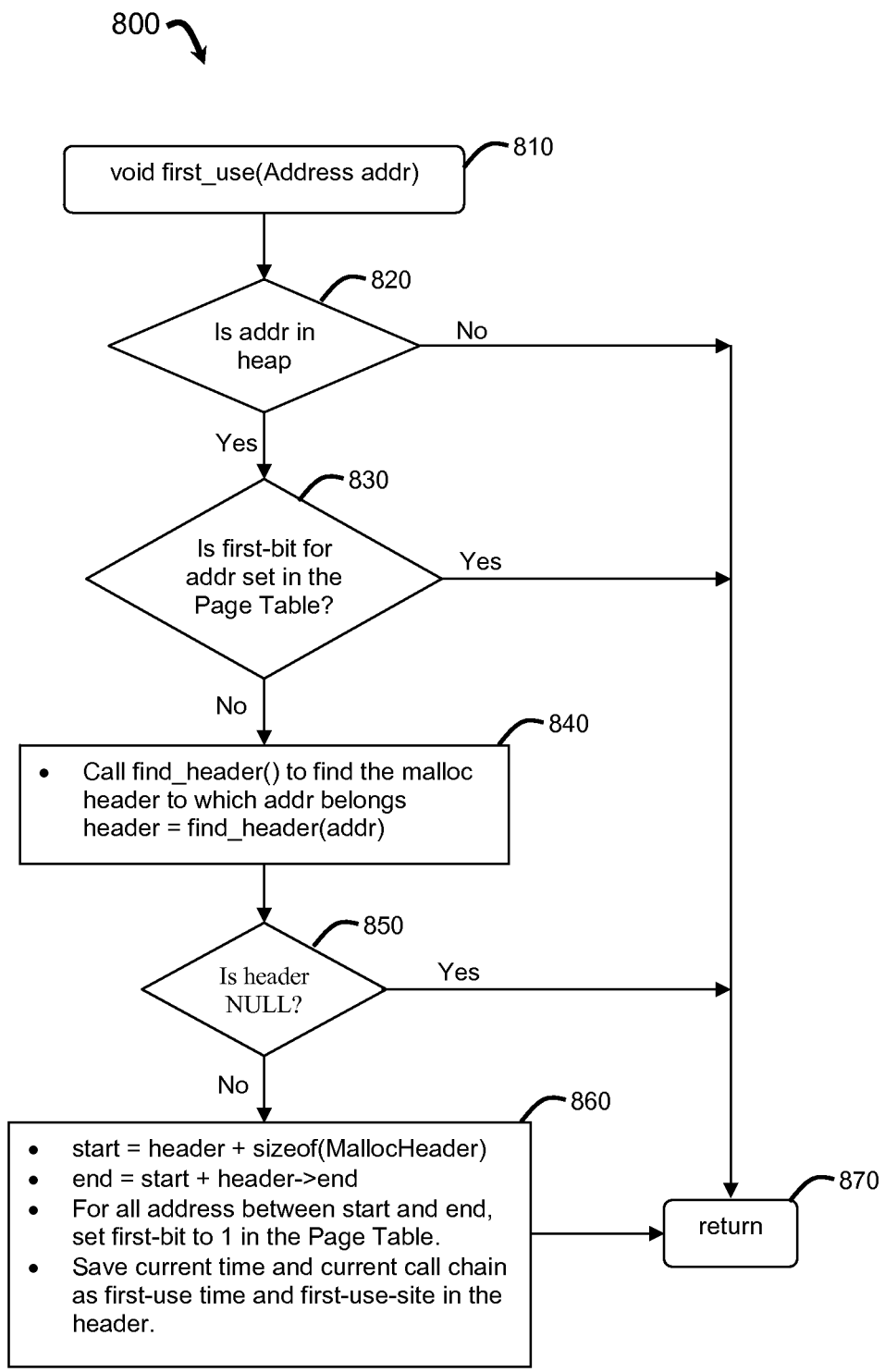
FIG. 8 illustrates a method 800 for instrumentation for identifying the first use.

FIG. 8 illustrates method 800 for instrumentation for identifying the first use. The memory usage occurs whenever a variable is used in the source code or whenever a load or store instruction is used in the object code to access a memory. The first_use in step 810 takes the address for which first use check needs to be done. In step 820 it first checks if the address of the memory about to be used falls in the heap, and then in step 830 if the first use bit for the address is already set to one in the page table. If not, then this memory block is about to be used for the first time. In step 840 the malloc header is located by calling find_header. In step 850, the header is checked. If header in not NULL then in step 860 the current time and call chain is recorded in the header as the first use time and location. For all bytes in the block, the first use bit in the page table is set to one to prevent repeating this action for all future uses of all bytes belonging to this heap block. Control returns in step 870.

Figure 9:
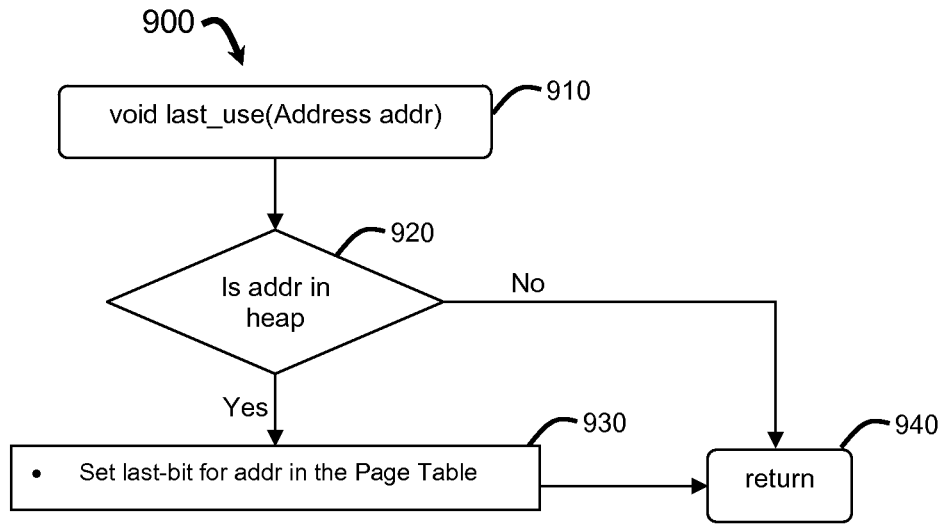
FIG. 9 illustrates a method 900 for instrumentation for identifying the last use.

FIG. 9 illustrates a method 900 for instrumentation for identifying the last use. The last_use function performs an inexpensive operation of setting the last use bit for the address in the page table to one. During the next census, this will indicate that the heap block is used and the census will be recorded in the malloc header as last use census. In step 910, it takes the address for which last use check needs to be done. In step 920, it checks if the address is within heap limits. If YES, then in step 930, it sets the last use bit corresponding to the address in the bit map table to one. Control returns in step 940.

Figure 10:
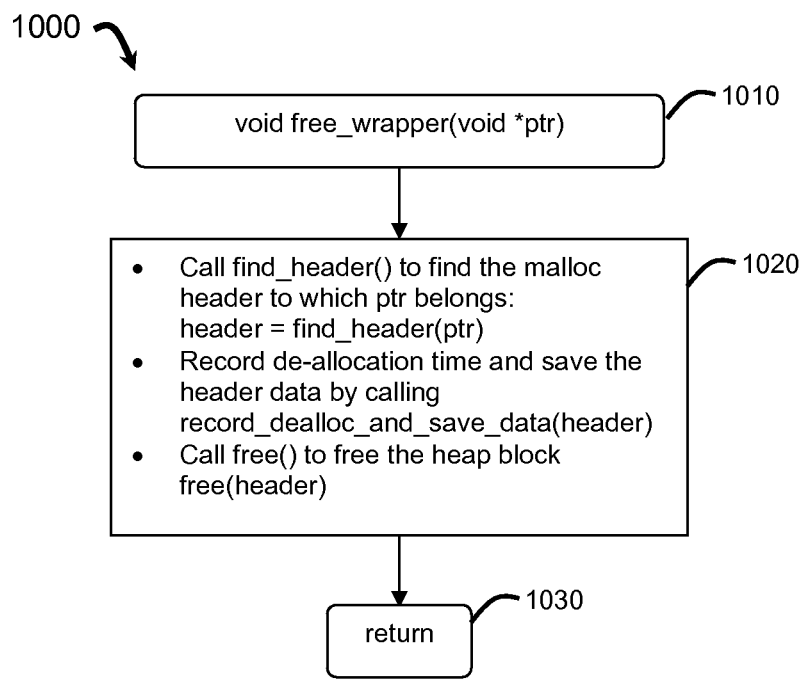
FIG. 10 illustrates a method 1000 where the free wrapper that replaces calls to free function.
Figure 11:
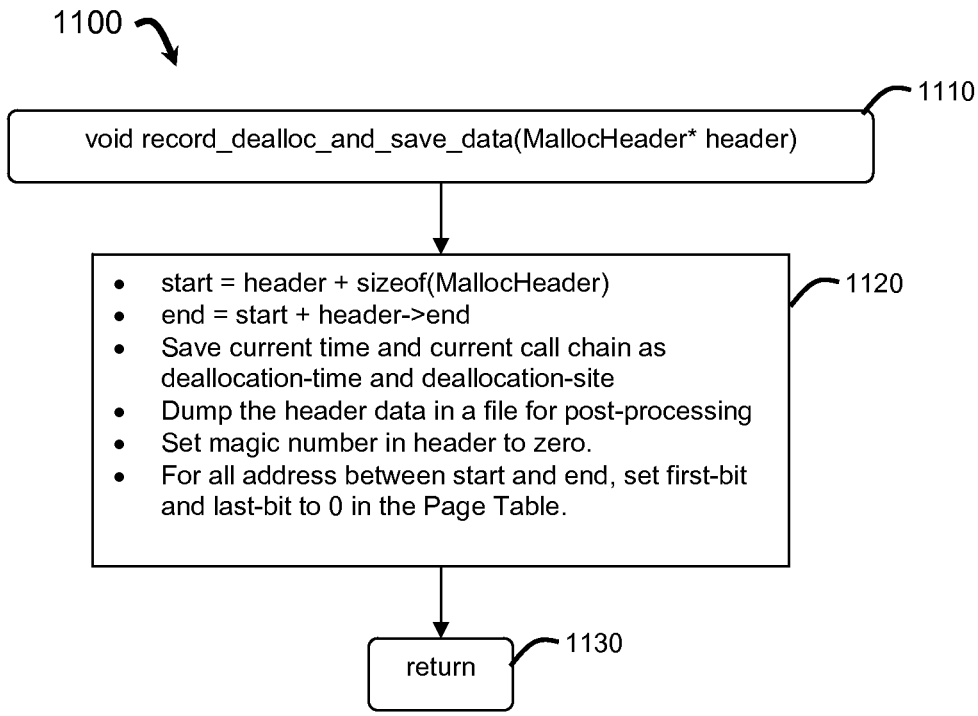
FIG. 11 illustrates action 1110 to be performed while de-allocating a heap block.

FIG. 10 illustrates a method 1000 of free wrapper function 1010 that replaces calls to free function. Memory de-allocation is done by directly or indirectly calling free( ) function. The instrumentation engine replaces each call to free(ptr) by a call to free_wrapper(ptr) of step 1020 as described previously in step 250 in FIG. 2, where ptr is the pointer requested to be freed. The step 1020 first finds the malloc header by calling find_header as illustrated previously in FIG. 7. Then as illustrated in FIG. 11 calls record_dealloc_and_save_data to record the current time and call chain as the de-allocation time and location in the malloc header, to dump the malloc header information into a file for post-processing, and to do clean up (clear the magic number in the malloc header and page table entries for bytes belonging to the current heap block). Control returns in step 1030.

The page table is a bit mapping collection of all heap addresses. Page table can either be implemented either using an array of Status or a HashTable<address, status> as underlying data structure for providing fast access and manipulation. It can also be implemented using technique similar to the one used in IBM® Rational® Purify®, where accessing and manipulating the bit mapping is relatively fast, and a page gets created only when needed. In any of these cases, following methods are trivial to implement using access and update operations of underlying data structure:
TABLE-US-00001 void init_page_table(PageTable *pt); bool get_first_use_bit(PageTable *pt, Address addr); bool get_last_use_bit(PageTable *pt, Address addr); void set_first_use_bit(PageTable *pt, Address addr, bool value); void set_last_use_bit(PageTable *pt, Address addr, bool value); void set_first_use_bit_range(PageTable *pt, Address start, Address end, bool value); void set_last_use_bit_range(PageTable *pt, Address start, Address end, bool value); void free_page_table(PageTable *pt);

The census record consists of the timestamp and call chain at the time of starting census. Censuses are stored in an array, where census id can be used as index for the array, and a variable is used to remember the current census id. Census is performed whenever the total memory allocation since the last census crosses a use defined threshold.
TABLE-US-00002 typedef struct_Census {time_t census_time; /* clock time when census started */ Address* census_site; /* call chain when census started */} Census; #define MAXCENSUS 1024 Census census_list[MAXCENSUS]; int current_census; int CENSUS_THRESHOLD; int mallocs_since_last_census;

Census is performed on active heap memory specified by heap-start and heap-end. The mechanism to get call chain, heap-start and heap-end are platform (hardware, operating system) dependent, but the mechanism exists on all platforms. Therefore, for the purpose of this disclosure it can be assumed that such mechanisms are exposed through following interfaces:
TABLE-US-00003 Address* get_stack_trace(int max_trace_length); extern Address get_heap_start( ) extern Address get_heap_end( );

The MAXCENSUS value used here is indicative, and in general can be set to any suitable and configurable value without requiring any change in the method described here.

The malloc header is used to store various data related to a heap block that is utilized to compute lag, drag, void, and use. It is defined as following:
TABLE-US-00004 /* magic number is a unique and rare occuring bit pattern */ #define MALLOC_HEADER_MAGIC_NUMBER 0xABCDABCD typedef struct_MallocHeader {int magic_number; time_t alloc_time; Address* alloc_site; time_t first_use_time; Address* first_use_site; int last_use_census; time_t dealloc_time; Address* dealloc_site; size_t size;} MallocHeader; void dump_malloc_header(MallocHeader* header);

This is a rather straightforward method to implement a function that writes value of each field in a malloc header into a file. These data structures and functions are used in describing the code. Instrumentation. The MALLOC.sub.-HEADER.sub.-MAGIC.sub.-NUMBER value is indicative, and any other value that doesn't or rarely occur in the memory can be chosen without requiring any change in the method described here.

At the start of the program as illustrated in FIG. 3, the method 300 comprises initialization of the page table and census information. It is achieved by inserting a call to init_wrapper( ) function at the start of program execution in step 310. In step 320 the page table is initialized by first setting the bitmap in pages for heap address range to "00", meaning both first and last use bits are set to 0, and setting bitmap in page table for non-heap address ranges to "11", meaning both first and last use bits are set to 1. The advantage here is in improving efficiency since non-heap addresses doesn't need to be tracked for lag, drag, void and use. In step 330 the census information is initialized by setting the current_census id to zero, setting the memory allocated since last census to zero, mallocs_since_last_census=0, and allowing the user configured CENSUS_THRESHOLD value. Once the initialization is completed, the method return in step 240 to the next operation.

Figure 4:
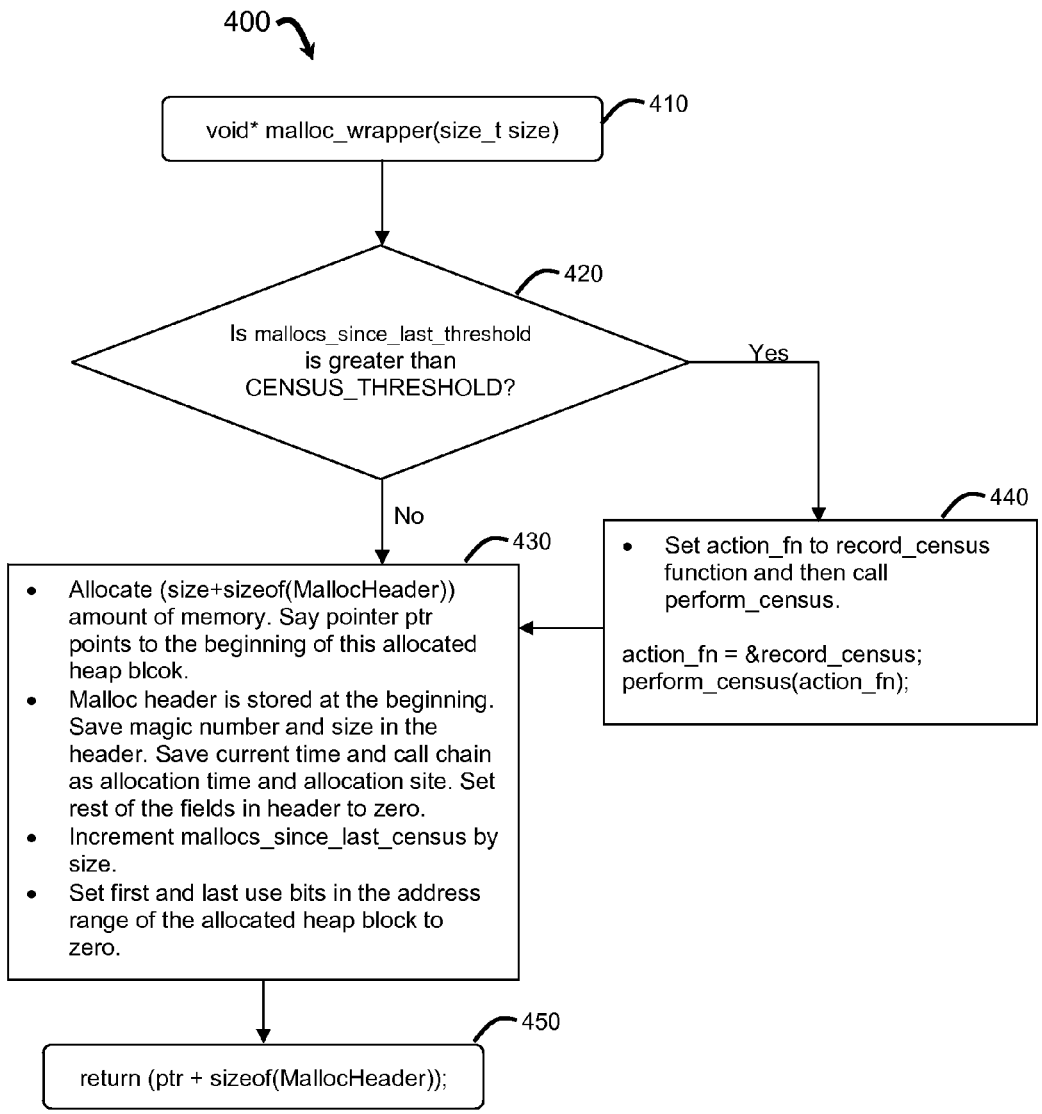
FIG. 4 illustrates the malloc wrapper 400 that replaces calls to malloc function.

The malloc_wrapper function 400 is shown in FIG. 4. Memory allocation is done by directly or indirectly calling malloc( ) function. The instrumentation engine replaces each call to malloc(size) by a call to malloc_wrapper(size) in step 410, where size is the amount of memory requested to be allocated. The step 420 checks whether the user defined threshold to perform census has been breached. If YES, then in step 440 the method (method 600 as described in FIG. 6) to perform census is invoked with record_census (method 500 as described in FIG. 5) action handler. If NO, or after doing step 440, in step 430, extra memory is allocated to store the malloc header for the heap block being allocated, and the header residing at the beginning of the allocated memory block is initialized. In the malloc header, it saves the magic number at the beginning, so that the start of the header and the memory block can be identified while sweeping the heap for performing future censuses. Current timestamp and call chain is also stored in the header to mark the allocation time. The first use time, the last use census, and de-allocation time are initialized with zero. In step 450, a pointer that is just after the header is returned to the caller of malloc( ).

FIG. 10 illustrates actions performed 500 for each malloc block in the heap while performing a census. The record_census function in step 510 defines the action taken while performing the census. In step 520 for every byte in the malloc block, the last use bit in the page table is checked. In step 530 if the last use bit for any byte is found to be one, it indicates that the memory block has been used since the last census. Then in step 540 the current census id is recorded in the malloc header, and all last use bits in the page table for the malloc block are set to zero. Control returns in step 550.

Figure 12:
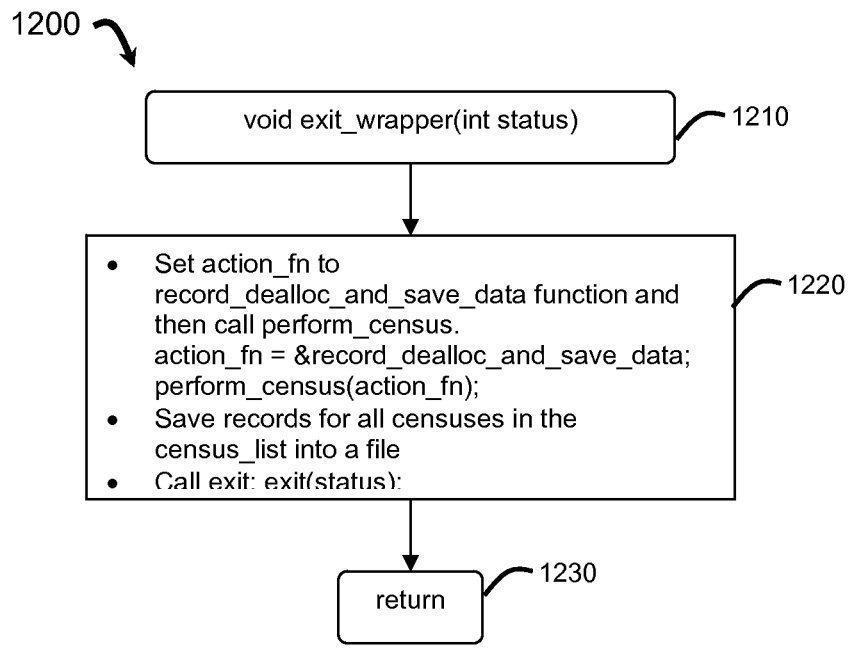
FIG. 12 illustrates the wrapper 1200 to perform the last census when program ends.

FIG. 11 illustrates the function for performing heap census 600. The census is essentially a single pass sweep of the heap. The step 610 takes an action function to be executed for each malloc block found in the heap. In step 620 the current census id is incremented by 1 and census id, current time stamp and call chain is recorded. In step 630, 640 and 650, each memory from start to end of the heap is checked to see whether the memory contains magic number indicating start of a memory block. In step 660, while sweeping the heap, if the magic number is found, it indicates the start of the malloc header followed by the malloc block. The action function is executed by passing it the malloc header. In step 670, when it reached end of the heap memory, the census operation completes FIG. 12 illustrates the find_header function 700 for finding the header of the malloc block that contains the given address. The find_header is a utility used while performing the instrumentation for memory usage. In step 710, it takes the memory address for which header needs to be found. In step 720, it casts the address to malloc header. In step 730, 740, 750, for a given address, it checks whether the address is within heap limits and traverses the heap in backward direction looking for the magic number. When found, in step 760, it uses the heap block size stored in the header to verify that the given address lies within the block. If true, in step 775, it returns the start of the malloc header, else it returns NULL in step 780 indicating failure.

Figure 13:
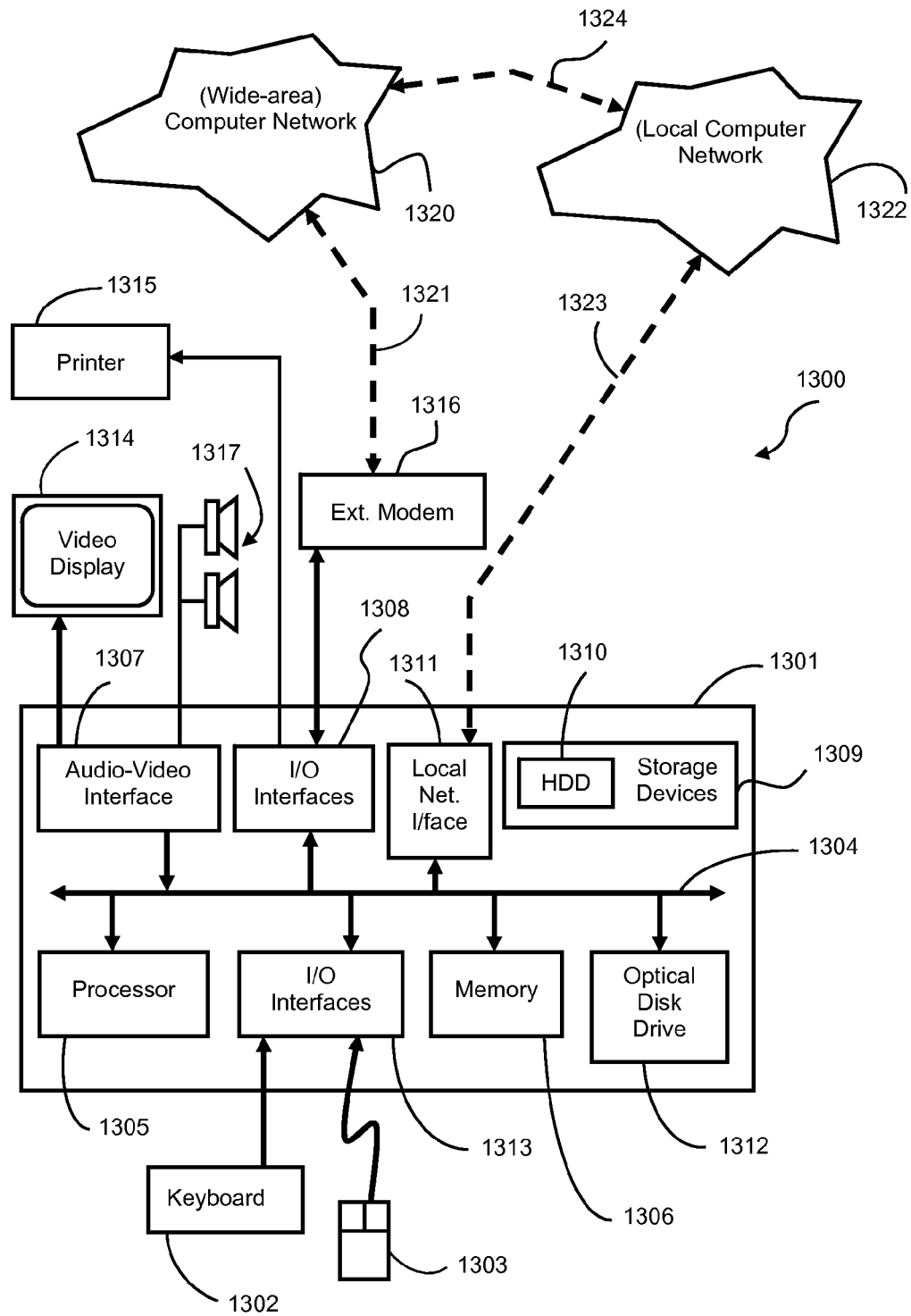
FIG. 13 illustrates a system 1300 on which FIGS. 2 to 12 may be implemented.

FIG. 13 illustrates method 800 for instrumentation for identifying the first use. The memory usage occurs whenever a variable is used in the source code or whenever a load or store instruction is used in the object code to access a memory. The first_use in step 810 takes the address for which first use check needs to be done. In step 820 it first checks if the address of the memory about to be used falls in the heap, and then in step 830 if the first use bit for the address is already set to one in the page table. If not, then this memory block is about to be used for the first time. In step 840 the malloc header is located by calling find_header. In step 850, the header is checked. If header in not NULL then in step 860 the current time and call chain is recorded in the header as the first use time and location. For all bytes in the block, the first use bit in the page table is set to one to prevent repeating this action for all future uses of all bytes belonging to this heap block. Control returns in step 870

FIG. 14 illustrates a method 900 for instrumentation for identifying the last use. The last_use function performs an inexpensive operation of setting the last use bit for the address in the page table to one. During the next census, this will indicate that the heap block is used and the census will be recorded in the malloc header as last use census. In step 910, it takes the address for which last use check needs to be done. In step 820, it checks if the address is within heap limits. If YES, then in step 930, it sets the last use bit corresponding to the address in the bit map table to one. Control returns in step 940.

FIG. 15 illustrates a method 1000 where the free wrapper that replaces calls to free function. Memory de-allocation is done by directly or indirectly calling free( ) function. The instrumentation engine replaces each call to free(ptr) by a call to free_wrapper(ptr) of step 820 as described previously in FIG. 8, where ptr is the pointer requested to be freed. The step 1020 first finds the malloc header by calling find_header as illustrated previously in FIG. 7. Then as illustrated in FIG. 11 calls record_dealloc_and_save_data to record the current time and call chain as the de-allocation time and location in the malloc header, to dump the malloc header information into a file for post-processing, and to do clean up (clear the magic number in the malloc header and page table entries for bytes belonging to the current heap block). Control returns in step 1030.

FIG. 11 illustrates a method 1100 that records the de-allocation timestamp and dumps the header data into a file for further processing to compute lag and drag. The step 1110 takes a malloc header to process. The step 1120 first computes start and end of the memory block. The malloc header is just before the memory block, so the start of the block is computing by using the size of malloc header, and end is computed using the block size stored in the header. The current call chain and time stamp is stored in the header as de-allocation time and de-allocation site. Then the data is dumped into a file and for all addresses in the memory, the first use and last use bits in the bitmap table are set to zero. Control returns in step 1130.

FIG. 12 illustrates the wrapper 1200 to perform the last census when program ends. At the end of a program, the exit function is called with a status code. The instrumentation engine replaces the exit(status) call to exit_wrapper(status). In step 1210 the exit_wrapper takes the status argument. In step 1220, the action function is set to record_dealloc_and_save_data(as described previously in FIG. 11) and last census is performed, however. In this census, for every heap block, the exit time is recorded as the de-allocation time, and the malloc header of the heap block is dumped for post-processing, and the heap block is freed. After performing the last census, the real exit is called to terminate the program. Control returns in step 1230.

As described previously for code instrumentation, for each census, timestamp and the call chain are recorded. And for each memory block, timestamp and call chain at the time of allocation, first use and de-allocation of the memory block, size and the last use census id are recorded. The last use census id is used to extract the timestamp and call site for the last use of the block from the census record. This leads to following tuple for each memory block: <size, allocation-time, allocation-site, first-use-time, first-use-site, last-use-time, and last-use-site, deallocation-time, deallocation-site>. These tuples have following properties:

1. The allocation-time is unique, i.e. no two tuples have same allocation-time, therefore allocation-time can be used as an identity for a memory block.

2. This condition is true for all memory records: (allocation-time<=first-use-time<=last-use-time<=deallocation-time) OR (allocation-time<=deallocation-time AND first-use-time==0 AND last-use-time==0)

3. Since the records for memory blocks are dumped when they are freed, the records exist sorted in the ascending order of deallocation-time. Lag, drag, use and void for a tuple can be computed as following: TABLE-US-00005 [0062] If first-use-time==0 (last-use-time==0 will also be true): lag=0, use=0, drag=0, void=size*(deallocation-time−allocation-time) Else lag=size*(first-use-time−allocation-time) use=size*(last-use-time−first-use-time) drag=size*(deallocation-time−last-use-time) void=0

Memory records with same allocation-site (allocation call chain) are clubbed together. The lag, drag, void and use for each allocation site is computed by adding lag, drag, void and use respectively for individual memory blocks with the same allocation-site. This results into following tuples: <allocation-site, lag, drag, void, use>. These tuples are then ranked by sorting them in the descending order of waste, where waste is defined as (lag+drag+void), and presented to the user in a tabular format. Such ranking makes it easy for a user to identify the most wasteful allocation sites in the program and improve the logic to reduce the wastage of heap memory. If user desires, the information can be sorted on any other column: lag, drag, void, use, percentage of waste, % lag, % drag, % void, % use, etc.

It should be apparent to a person skilled in the art that some enhancements that can coexist with the above embodiments. Various types of inter and intra procedural data and control flow analysis can be performed at both source code and object code level to eliminate redundant instrumentations. For example, if in a basic block, a memory location is accessed more than once, or multiple bytes of same memory blocks are accessed (e.g. multiple fields of an structure), then only the first and the last accesses need to be instrumented for data collection. Similarly, since this analysis only tracks heap memory access, there is no need to instrument any memory read or write done through an offset from the stack pointer ($sp) or local variable.

The above embodiments may be implemented using a computer system (computing device) 1300, such as that shown in FIG. 13. The processes described may be implemented as software, such as, as one or more application programs executable within the computer system 1300. In particular, the steps of the process may be realized by instructions in the software that are carried out within the computer system 1300. The instructions may be formed as one or more program code modules, each for performing one or more particular tasks. The software may be stored in a computer readable medium, including the storage devices described below, for example. The software is loaded into the computer system 1300 from the computer readable medium, and then executed by the computer system 1300. A computer readable medium having such software or computer program recorded on it is a computer program product.

As seen in FIG. 13, the computer system 1300 is formed by a computer module 1301, input devices such as a keyboard 1302 and a mouse pointer device 1303, and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The network 1320 may be a wide-area network (WAN) such as the Internet or a private WAN. Where the connection 1321 is a telephone line, the modem 1316 may be a traditional "dial-up" modem. Alternatively, where the connection 1321 is a high capacity (e.g. cable) connection, the modem 1316 may be a broadband modem. A wireless modem may also be used for wireless connection to the network 1320.

The computer module 1301 typically includes at least one processor unit 1305, and a memory unit 1306 for example formed from semiconductor random access memory (RAM) and read only memory (ROM). The module 1301 also includes a number of input/output (I/O) interfaces including an audio-video interface 1307 that couples to the video display 1314 and loudspeakers 1317, an I/O interface 1313 for the keyboard 1302 and mouse 1303 and optionally a joystick (not illustrated), and an interface 1308 for the external modem 1316 and printer 1315. In some implementations, the modem 1316 may be incorporated within the computer module 1301, for example within the interface 1308. The computer module 1301 also has a local network interface 1311 which, via a connection 1323, permits coupling of the computer system 1300 to a local computer network 1322, known as a Local Area Network (LAN). As also illustrated, the local network 1322 may also couple to the wide area network 1320 via a connection 1324, which would typically include a so-called "firewall" device or similar functionality. The network interface 1311 may be formed by an Ethernet™ circuit card, a wireless Bluetooth™ or an IEEE 802.11 wireless arrangement.

The interfaces 1308 and 1313 may afford both serial and parallel connectivity, the former typically being implemented according to the Universal Serial Bus (USB) standards and having corresponding USB connectors (not illustrated). Storage devices 1309 are provided and typically include a hard disk drive (HDD) 1310. Other devices such as a floppy disk drive and a magnetic tape drive (not illustrated) may also be used. An optical disk drive 1312 is typically provided to act as a non-volatile source of data. Portable memory devices, such optical disks (eg: CD-ROM, DVD), USB-RAM, and floppy disks for example may then be used as appropriate sources of data to the system 1300.

The components 1305, to 1313 of the computer module 1301 typically communicate via an interconnected bus 1304 and in a manner which results in a conventional mode of operation of the computer system 1300 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 1310 and read and controlled in execution by the processor 1305. Intermediate storage of such programs and any data fetched from the networks 1320 and 1322 may be accomplished using the semiconductor memory 1306, possibly in concert with the hard disk drive 1310. In some instances, the application programs may be supplied to the user encoded on one or more CD-ROM and read via the corresponding drive 1312, or alternatively may be read by the user from the networks 1320 or 1322. Still further, the software can also be loaded into the computer system 1300 from other computer readable media. Computer readable media refers to any storage medium that participates in providing instructions and/or data to the computer system 1300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The operations disclosed may alternatively be implemented in dedicated hardware such as one or more integrated circuits performing the functions or sub functions of the described processes. Such dedicated hardware may include graphic processors, digital signal processors, or one or more microprocessors and associated memories.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements.

We claim:

1. A computer implemented method for optimizing usage of heap memory, the method comprising:
    loading into memory of a computer by a processor of the computer, existing program code instructions of a computer program;
    inserting additional program code instructions at predefined locations of the existing program code, the additional program code instructions being configured upon execution to search a header of a heap memory block utilized by the computer program and to identify data associated with lag and drag lifetimes of the heap memory block when used by the computer program;
    additionally inserting initial program code instructions at an initial portion of the existing program code operable to create a page table comprising census information, and also ending program code instructions at an ending portion of the computer program operable to perform a final update of the census information in the page table;
    executing the computer program with all of the inserted program code;
    creating during execution of the computer program the header of the heap memory block allocated in heap memory, collecting runtime data comprising timestamps associated with lag and drag lifetimes of the heap memory block and storing the runtime data in the header of the heap memory block; and
    identifying subsequent to the execution of the computer program from the collected runtime data both the lag and also the drag lifetimes associated with the heap memory block by utilizing the final update of the census information.

2. The method of claim 1, wherein the header is configured to record a size and allocation time of the heap memory block when the heap memory block is allocated.

3. The method of claim 1, wherein collecting runtime data further comprises:
    recording a de-allocation time in the header; and
    dumping the header into a file when the heap memory block is freed.

4. The method of claim 1, further comprising:
    performing a census after a user defined duration comprising sequentially sweeping through the heap memory and, if the header of the heap memory block is found, reading a size of the heap memory block in the header;
    checking a bit map table for all addresses associated with the heap memory block;
    recording a current timestamp as a last used timestamp in the header if any last use bit has a value of 1 for any portion of memory in the heap memory block; and
    setting a last use bit for all memory in the heap memory block to a value of zero.

5. The method of claim 1, wherein the predefined locations include a start of the computer program, one or more memory allocation sites, one or more memory usage sites, one or more memory de-allocation sites, and a end of the computer program.

6. The method of claim 1, wherein the page table is further configured to maintain a bit mapping for the heap memory block and also to include two bits being stored for each byte in the heap memory block.

7. The method of claim 6, wherein the first bit of the two bits indicates first use of the heap memory block and the second bit of the two bits indicates last use of the heap memory block.

8. The method of claim 7, wherein the last use bit is always set regardless of whether the first use bit is set.

9. A computing system comprising a processor, a memory, a computer readable medium coupled to the processor, and computer instruction encoded in the computer readable medium and executable by the processor causing the processor to perform the steps of:
    loading into memory of the computer system by the processor, existing program code instructions of a computer program
    inserting additional program code instructions at predefined locations of the existing program code, the additional program code instructions being configured to search a header of a heap memory block utilized by the computer program and to identify data associated with lag and drag lifetimes of the heap memory block when used by the computer program;
    additionally inserting initial program code instructions at an initial portion of the existing program code operable to create a page table comprising census information, and also ending program code instructions at an ending portion of the computer program operable to perform a final update of the census information in the page table;
    executing the computer program with all of the inserted program code;
    creating during execution of the computer program the header of the heap memory block allocated in heap memory, collecting runtime data comprising timestamps associated with lag and drag lifetimes of the heap memory block and storing the runtime data in the header of the heap memory block; and
    identifying subsequent to the execution of the computer program from the collected runtime data both the lag and also the drag lifetimes associated with the heap memory block by utilizing the final update of the census information.

10. The system of claim 9, wherein the header is configured to record a size and allocation time for the heap memory block.

11. The system of claim 9, wherein collecting runtime data further comprises recording a de-allocation time in the header; and dumping the header into a file when the heap memory block is freed.

12. The system of claim 9, further comprising:

performing a census after a user defined duration comprising sequentially sweeping through the heap memory and, if the header of the heap memory block is found, reading a size of the heap memory block in the header;

checking a bit map table for all addresses associated with the heap memory block;

recording a current timestamp as a last used timestamp in the header if any last use bit has a value of 1 for any portion of memory in the heap memory block; and setting a last use bit for all memory in the heap memory block to a value of zero.

13. The system of claim 9, wherein the predefined locations include a start of the computer program, one or more memory allocation sites, one or more memory usage sites, one or more memory de-allocation sites, and a end of the computer program.

14. The system of claim 9, wherein the page table is further configured to maintain a bit mapping for the heap memory block and also to include two bits being stored for each byte in the heap memory block.

15. The system of claim 14, wherein the first bit of the two bits indicates first use of the heap memory block and the second bit of the two bits indicates last use of the heap memory block.

* * * * *